Patented Dec. 14, 1948

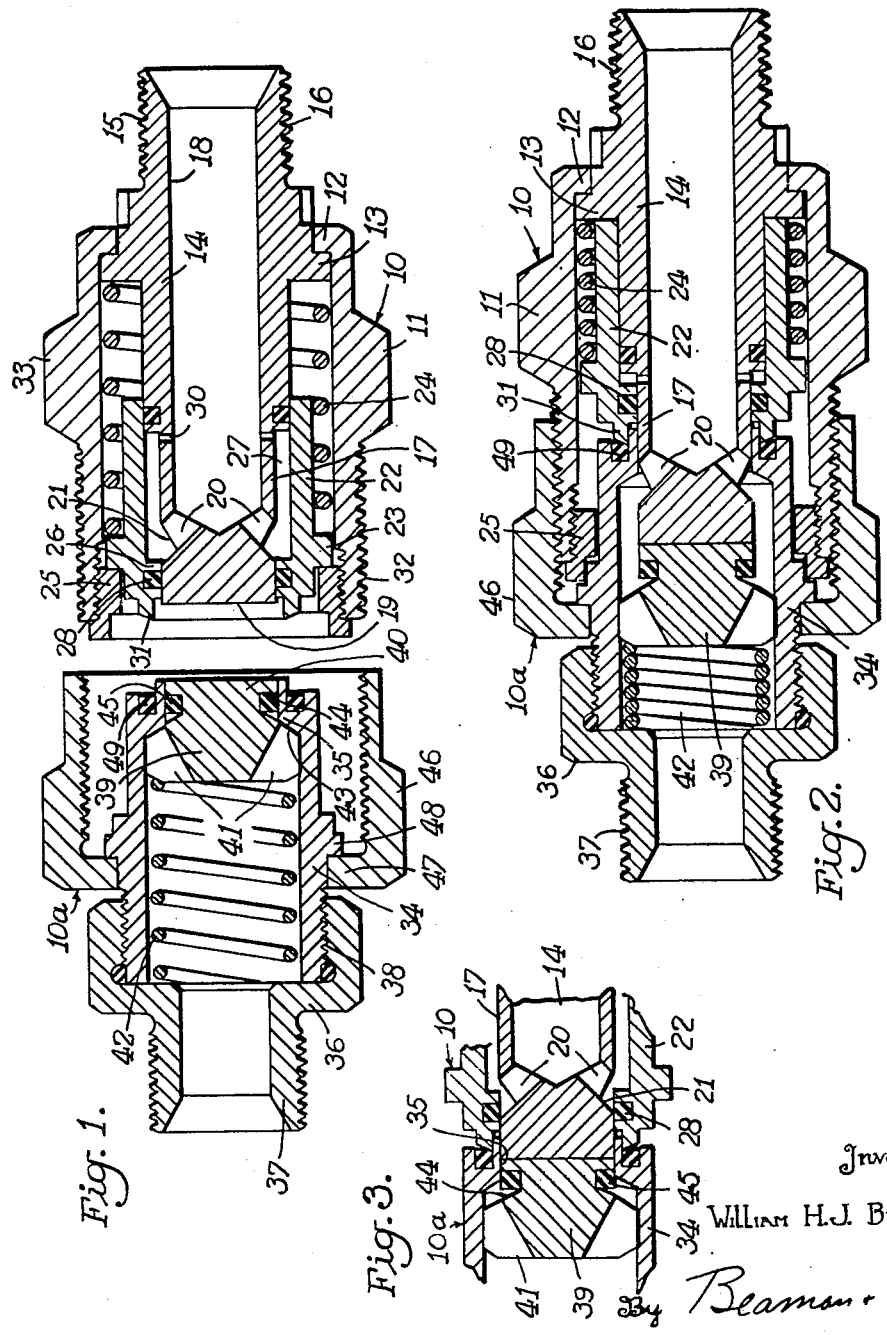

2,456,045

UNITED STATES PATENT OFFICE 2,456,045

PIPE COUPLING

William Hudson James Brock, Leamington Spa, England

Application December 29, 1945, Serial No. 637,882
In Great Britain January 2, 1945

3 Claims. (Cl. 284—19)

1

This invention relates to pipe couplings and it has for its object to provide an improved form of coupling of the kind (hereinafter mentioned as the kind referred to) comprising a pair of easily separable coupling parts, each of which incorporates a valve arranged to close the exposed fluid opening of the coupling part when the latter is uncoupled and to open automatically as the coupling parts are connected together, thus providing a free fluid passage through the united coupling.

In particular it is the object of the invention to provide a coupling in which rubber or like resilient sealing means are provided for the valves of the coupling parts to ensure a fluidtight seal in each of the two parts when the latter are separated. In a pipe coupling of the kind referred to, consisting of two coupling parts of which the first comprises a tubular stem with lateral apertures closed by a sleeve sliding on the stem, and the second comprises a tubular body with an end aperture closed by an axially movable valve, the axially movable valve being displaced inwardly by the stem, and the sleeve being displaced along the stem by the tubular body as the parts are brought together, until the apertures in the stem pass through the end aperture in the tubular body, according to the invention the sleeve and axially movable valve are grooved circumferentially to receive sealing rings engaging respectively with the stem and the curved wall of the end aperture in the tubular body when the coupling parts are separated.

At least one of the sealing rings is preferably arranged to have freedom for limited axial movement with respect to the part in which it is mounted, so that its position is dependent on the sense of the pressure difference across it. Thus if desired the said sealing ring may be of rectangular cross section, said ring being disposed within a groove of trapezoidal shape in cross section. The sealing ring of the axially movable valve may be mounted within its groove so that its outer part at least has freedom to move axially.

Conveniently the sleeve member is formed at its inner end with a portion of reduced diameter which is slidable upon a corresponding reduced diameter portion of the stem and which is grooved for the reception of the sealing ring belonging to the sleeve. An annular space between the reduced diameter portion of the tubular stem and the interior of the sleeve can be placed in permanent communication with the interior of the stem by one or more holes formed therein adjacent the outer end of the reduced diameter por-

2 tion. Also the body of the first coupling part preferably has an internal flange which engages the tubular stem so as to impart thrust to said stem as the coupling is tightened. A tubular spigot on the sleeve may engage a sealing ring disposed within an annular groove in the inner end of the tubular body to produce a fluidtight seal between the coupling parts.

The invention is illustrated by way of example in the accompanying drawings, in which:

Figure 1 is a sectional elevation of the coupling parts separated, the valves being closed;

Figure 2 is a similar view showing the coupling fully united; and

Figure 3 is a fragmentary sectional view showing the position of the parts at a stage in the disconnection of the coupling.

In the following description, the ends of the two coupling parts which engage each other when the parts are brought together are referred to as the "inner" ends, and the other ends as the "outer" ends.

The first part of the coupling is indicated at 10 and comprises a tubular body 11 having an internal flange 12 at its outer end, the flange 12 being engaged at its inner side by a flange 13 on a tubular stem 14 which is thus located concentrically within the body 11, and projects through the outer end thereof as shown at 15, this projecting end being threaded at 16 for attachment to a pipe or other conduit (not shown). The inner end of the stem 14 has its external diameter reduced to form a spigot 17, a passage 18 extending axially through the stem from its outer end, being arranged to stop short of the flat inner end 19 of the stem 14. The passage 18 however communicates with a circumferential series of ports 20 set back a little distance from this end 19. A shallow circumferential groove 21 of V-shape in section is formed around the stem 14, and the outer ends of the ports 20 lead into said groove. Within the body 11 and slidable on the stem 14, is a sleeve 22 having an external flange 23 near its inner end, the sleeve 22 being urged towards the inner end of the body 11 by a spring 24 arranged between the said flange 23 and the flange 13 on the stem, and being limited in its outward movement by a stop ring 25 screwed into the inner end of the body 11 to engage the sleeve flange 23. The internal diameter of the sleeve is stepped, its inner end part 26 fitting on the spigot 17 of the stem, and the major portion of its length being of a diameter to fit slidably upon the larger main part of the stem 14. When the sleeve flange 23 is in engagement with the stop ring 25, the end part 26 surrounds the inner end of the stem 14 beyond the ports 20 therein, so that the ports 20 open into an annular space 27 between the stem spigot 17 and the sleeve 22. A sealing ring 28 is located in an internal circumferential groove around the smaller diameter part 26 of the sleeve, and a second sealing ring 29 in a groove in the outer surface of the larger diameter part of the stem engages the interior of the larger diameter part of the sleeve 22. A series of small radial ports 30 in the stem 14 close to the change in diameter of the latter connect the annular space 27 permanently to the bore 18 of the stem 14. The end face of the sleeve which is exposed at the inner end of the coupling part carries a cylindrical flange 31, the internal diameter of the flange being larger than the diameter of the stem 14, and the end face of the flange 31 being chamfered to provide a narrow face at its radially inner edge. The body 11 is threaded externally at 32, and is preferably formed with a hexagonal flange 33 to enable it to be gripped by a spanner.

The second part of the coupling is indicated generally at 10a and comprises a tubular body 34 having a uniform internal diameter except at its inner end, where it has a short portion 35 of reduced diameter providing an end aperture smaller than the main bore of the body. On the outer end is mounted an adaptor 36 having a boss 37 for attachment to a pipe or hose (not shown), the adaptor 36 being secured by an external thread 38 on the body. In the body 34 there is axially slidable a valve member 39 having a head portion 40 adapted to fit closely in the reduced portion 35 of the body, and a convergent tail portion from which project lateral wings 41 adapted to guide the valve member in the body 34. The valve member 39 is urged by a spring 42 towards a position in which its head 40 lies in the reduced portion 35 of the body, the wings 41 then engaging the shoulder 43 at the change of diameter in the body. The valve member 39 has a circumferential groove 44 in its head portion to receive a sealing ring 45 which engages the curved wall of the reduced portion 35 of the body 34 to seal the coupling part 10a. The groove 44 is of trapezoidal shape in radial section, the side of the groove 44 nearer the tail 41 of the valve member being inclined so that the groove is of increasing width towards its mouth, thus allowing the radially outer part of the ring to move axially to a greater extent than the inner part. The sealing ring 45 is composed of soft rubber or like material, and can therefore readily alter its shape to accommodate such movements. A tube nut 46 is mounted on the part 10a of the coupling, its internal flange 47 being located between a flange 48 on the body, and the adaptor.

In each of the coupling parts 10 and 10a, when the valve therein is in its closed position, the central member, i. e. the stem 14 in the first part 10 and the valve member 39 in the second part 10a is flush with, or slightly proud of the immediately surrounding surface, so that these central members 14, 39, which both have flat ends, make contact with each other as soon as the parts are brought together, and simultaneously with, or slightly before, the engagement of the cylindrical flange 31 on the sleeve 22 of the first part 10 with a sealing ring 49 set in an annular groove in the end face of the body 34 of the second coupling part 10a. The head of the valve member 39 in the second coupling part 10a has the same diameter as the inner end of the stem 14 of the first coupling part 10, and the internal diameter of the reduced end part 35 of the body 34 of the second coupling part 10a is the same as the internal diameter of the smaller end 26 of the sleeve 22.

When the coupling parts 10, 10a are separated, the valves in both are closed, and escape of fluid from both is prevented, the sealing rings 28, 45, which are of rubber or similar soft resilient material, providing a substantially complete seal against leakage. When the parts 10, 10a are brought together, the end 19 of the stem 14 engages with the head 40 of the valve 39 in the second part 10a, and the inner end of the body 34 of the second part 10a engages with the end of the sleeve 22, with the result that the valve member 39 is pushed back into the body, and the sleeve 22 is pushed along the stem 14. As this movement continues, the ports 20 in the stem 14 pass through the reduced end portion 35 of the body 34 into the larger diameter part thereof, thus producing a fluid passage through the coupling, as will be seen in Figure 2, which shows the coupling parts fully tightened. Leakage between the parts when coupled together is prevented by the end seal 31, 49 between the sleeve and the body 34 and the parts may be so arranged that in the fully coupled condition the sleeve 22 is clamped tightly between the flange 13 on the stem 14 and the body 34 of the other coupling part 10a as shown in Figure 2.

With the arrangement described, a coupling is provided in which sealing rings of rubber or like material can be employed to give an effective seal when the parts 10, 10a are separated, but cannot be damaged or displaced during coupling and uncoupling of the parts. It has been found that a sealing ring of the kind employed in this coupling is likely to be displaced or damaged during movement over a port or controlling edge only if one side of the ring passes over the leading edge of the port, or the controlling edge, whilst there is a pressure difference across the seal with the higher pressure on the side remote from the port or edge. In such a case, the part of the seal which has passed over the leading edge of the port, or the controlling edge, is liable to be forced out of the groove, and deformed or damaged. The improved coupling device is designed to ensure that if there is difference between the pressures of fluid in the two halves when they are coupled together, regardless of which half contains fluid at the higher pressure, the seal in that half will continue to prevent flow of fluid as the parts are coupled, until the seal in the other half is in a position to allow a completely free flow of fluid past it.

This action is shown in Figure 3, where the coupling parts 10, 10a are being separated, there being a superior fluid pressure in the coupling part 10a when free flow through the coupling is interrupted. Relative to the body 34 and sleeve 22, the valve member 39 and stem 14 are together moving towards the right as the nut 46 is unscrewed, so that groove 21 passes across the sealing ring, and at the same time the sealing ring 45 has to pass across the edge of the reduced diameter portion 35. By making the groove 44 of trapezoidal cross section, the sealing ring 45 can be displaced towards the left by any pressure fluid which may at first flow from the parts 20, along the outside of the stem 14. This prevents the sealing ring 45 from becoming pinched between the left-hand edge of the groove 44 and the edge of the reduced diameter portion 35, until the danger of pinching is removed, namely when a point in the disconnecting is reached at which the ports 20 are completely beyond the sealing ring 28 so as to prevent further leakage of pressure fluid.

Again, if the coupling parts are brought together with an excess of pressure in the first half 10, the sealing ring 28 in the sleeve 22 does not pass fully over the leading edges of the ports 20 in the stem 14 until the groove 44 in the valve member 39 in the other half 10a has passed the controlling edge in that half to such an extent that the seal, by moving over against the side of the groove nearer to the tail 41 of the valve member, leaves a clear passage for fluid between itself and the controlling edge. If the excess of pressure is in the second half 10a of the coupling, the sealing ring 45 in the valve member 39 is held by the pressure against the side of the groove nearer to the head 40 of the valve, and the sealing ring 45 does not wholly pass the controlling edge until the sealing ring 28 in the sleeve 22 has completely crossed the leading edge of the groove 21 in the stem 14 into which the ports open. On separating the coupling halves 10, 10a, if a pressure difference is established as soon as the through passage is interrupted, it is the sealing ring in the coupling part in which the pressure is the higher which first comes into action.

Owing to the fact that the flat faces of the central coupling parts engage as soon as the parts are brought together, no air can be included when the parts are coupled, and, as the seal between the two parts is made before the valves begin to open, no fluid can escape during either coupling or uncoupling.

What I claim is:

1. A pipe coupling of the kind referred to, consisting of two coupling parts of which the first comprises a tubular stem with lateral apertures closed by a sleeve sliding on the stem and forming with the latter an annular fluid space in permanent connection with the interior of said stem, and the second comprises a tubular body with an end aperture closed by an axially movable valve, the axially movable valve being displaced, inwardly by the stem, and the sleeve being displaced along the stem by the tubular body as the parts are brought together, until the apertures in the stem pass through the end aperture in the tubular body, characterized by the fact that the sleeve and axially movable valve are both grooved circumferentially and are fitted with sealing rings engaging respectively with the end of the stem remote from said fluid port means and the curved wall of the end aperture in the tubular body when the coupling parts are separated and that the stem is also grooved circumferentially and fitted with a sealing ring for engaging the end of the sleeve adjacent said fluid port means, whereby said annular space is sealed at each end thereof.

2. A pipe coupling as claimed in claim 1, wherein the sleeve member is formed at its inner end with a portion of reduced diameter, which portion is slidable upon a corresponding reduced diameter portion of the stem and which is grooved for the reception of the sealing ring belonging to the sleeve.

3. A pipe coupling as claimed in claim 1, wherein the sleeve member is formed at its inner end with a portion of reduced diameter, which portion is slidable upon a corresponding reduced diameter portion of the stem and which is grooved for the reception of the sealing ring belonging to the sleeve, and said annular space is formed between the reduced diameter portion of the tubular stem and the interior of the sleeve and is placed in permanent communication with the interior of the stem by one or more holes formed therein adjacent the outer end of the reduced diameter portion.

WILLIAM HUDSON JAMES BROCK.

REFERENCES CITED

The following references are of record in the file of this patent:

UNITED STATES PATENTS

| Number | Name | Date |
| --- | --- | --- |
| 1,335,521 | Murphy | Mar. 30, 1920 |
| 2,185,173 | Fortune | Jan. 2, 1940 |
| 2,208,286 | Berger | July 16, 1940 |
| 2,208,620 | Baisch | July 23, 1940 |
| 2,210,282 | Corbin | Aug. 6, 1940 |
| 2,254,997 | Fisher | Sept. 2, 1941 |
| 2,314,683 | Berry | Mar. 23, 1943 |
| 2,360,733 | Smith | Oct. 7, 1944 |
| 2,383,249 | Harwick | Aug. 21, 1945 |
| 2,393,679 | Gunderson | Jan. 29, 1946 |